US012536937B2

(12) United States Patent
Park et al.

(10) Patent No.: US 12,536,937 B2
(45) Date of Patent: Jan. 27, 2026

(54) DISPLAY DEVICE

(71) Applicant: Samsung Display Co., Ltd., Yongin-Si (KR)

(72) Inventors: Sukjin Park, Yongin-si (KR); Seok Hwan Roh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/943,908

(22) Filed: Nov. 12, 2024

(65) Prior Publication Data

US 2025/0174166 A1 May 29, 2025

(30) Foreign Application Priority Data

Nov. 29, 2023 (KR) ........................ 10-2023-0170193

(51) Int. Cl.
*G09G 5/10* (2006.01)
*G09G 3/20* (2006.01)

(52) U.S. Cl.
CPC ....... *G09G 3/20* (2013.01); *G09G 2310/0243* (2013.01); *G09G 2310/0264* (2013.01); *G09G 2330/021* (2013.01)

(58) Field of Classification Search
CPC ............. G09G 3/20; G09G 2310/0243; G09G 2310/0264; G09G 2330/021
USPC .......................................................... 345/204
See application file for complete search history.

(56) References Cited

U.S. PATENT DOCUMENTS

| | | | | |
|---|---|---|---|---|
| 9,830,872 | B2 | 11/2017 | Kim | |
| 9,997,096 | B2 | 6/2018 | Shin | |
| 2006/0028395 | A1 * | 2/2006 | Nohara | G06F 3/1438 345/1.3 |
| 2006/0055655 | A1 | 3/2006 | Choi et al. | |
| 2017/0308487 | A1 * | 10/2017 | Oda | G06F 13/1673 |
| 2022/0335002 | A1 * | 10/2022 | Li | G06F 13/4282 |
| 2022/0358898 | A1 * | 11/2022 | Jeong | G09G 3/3266 |

FOREIGN PATENT DOCUMENTS

| | | | |
|---|---|---|---|
| KR | 10-2006-0024942 | A | 3/2006 |
| KR | 10-2011-0122615 | A | 11/2011 |
| KR | 10-2015-0134167 | A | 12/2015 |
| KR | 10-2154190 | B1 | 9/2020 |

* cited by examiner

*Primary Examiner* — Jennifer T Nguyen
(74) *Attorney, Agent, or Firm* — Innovation Counsel LLP

(57) ABSTRACT

A display device may include a display panel including a first display region and a second display region, a master panel driver configured to generate a common logic signal and to drive the first display region based on the common logic signal and a first slave panel driver configured to drive the second display region based on the common logic signal that is received from the master panel driver. No common logic signal is generated by the first slave panel driver.

18 Claims, 10 Drawing Sheets

DISPLAY DEVICE

CROSS-REFERENCE TO RELATED APPLICATION(S)

This application claims priority, under 35 USC § 119, to Korean Patent Application No. 10-2023-0170193 filed on Nov. 29, 2023 in the Korean Intellectual Property Office (KIPO), the content of which is herein incorporated by reference in its entirety.

BACKGROUND

1. Field

Present inventive concept relate to a display device, and more particularly to a display device that operates with low power consumption.

2. Description of the Related Art

Generally, a display device includes a display panel and a panel driver. The display panel includes a plurality of gate lines, a plurality of data lines, a plurality of emission lines and a plurality of pixels. The panel driver includes a gate driver providing a gate signal to the gate lines, a data driver providing a data voltage to the data lines, an emission driver providing an emission signal to the emission lines and a driving controller controlling the gate driver, the data driver and the emission driver.

Generally, when the display device includes a plurality of panel drivers, each of a plurality of driving controllers generates operating signals for driving a display panel so that power consumption may be increased.

SUMMARY

Some embodiments provide a display device in which a power consumption is reduced by having one panel driver generates a common logic signal for performing a common operation and applies the common logic signal to another panel drivers when performing the common operation.

According to embodiments, a display device may include a display panel including a first display region and a second display region, and a master panel driver and a first slave panel driver configured to drive the first display region and the second display region, respectively, based on the common logic signal that is generated by the master panel driver. The first slave panel driver is configured to receive the common logic signal from the master panel driver without generating the common logic signal.

In an embodiment, the master panel driver may include a master driving controller. The first slave panel driver includes a first slave driving controller. The master driving controller may generate the common logic signal and output the common logic signal to the first slave driving controller.

In an embodiment, the master panel driver may include a master driving controller. The first slave panel driver includes a first slave driving controller. The master driving controller includes a first master driving circuit configured to output a signal for performing a first driving operation. The first slave driving controller may include a first-first slave driving circuit configured to output a signal for performing a first driving operation. The common logic signal may be a signal for performing the first driving operation.

In an embodiment, the first master driving circuit may include a first-first master detail operation logic circuit configured to output a signal for performing a first-first detail operation and a first-second master detail operation logic circuit configured to output a signal performing a first-second detail operation. The first-first slave driving circuit may include a first-first-first slave detail operation logic circuit configured to output a signal for performing the first-first detail operation and configured to output a signal for performing the first-second detail operation. The common logic signal may be generated by the first-first master detail operation logic circuit. The first slave panel driver may perform the first-first detail operation based on the common logic signal.

In an embodiment, the common logic signal may be applied to the first slave driving controller, and the first-first-first slave detail operation logic circuit may remain inactive.

In an embodiment, the master driving controller may further include a second master driving circuit such that the master panel driver performs a second driving operation different from the first driving operation. The first slave driving controller may further include a first-second slave driving circuit such that the first slave panel driver performs the second driving operation. The common logic signal may include a first common logic signal and a second common logic signal. The first common logic signal may be a signal for performing the first driving operation and the second common logic signal may be a signal for performing the second driving operation.

In an embodiment, the second master driving circuit may further include a second-first master detail operation logic circuit configured to output a signal for performing a second-first detail operation and a second-second master detail operation logic circuit configured to output a signal for performing a second-second detail operation. The first-second slave driving circuit may include a first-second-first slave detail operation logic circuit configured to output a signal for performing the second-first detail operation and a first-second-second slave detail operation logic circuit configured to output a signal for performing the second-second detail operation. The second common logic signal may be generated by the second-first master detail operation logic circuit. The slave panel driver may perform the second-first detail operation based on the second common logic signal.

In an embodiment, the second common logic signal may be applied to the first slave driving controller, and the first-second-first slave detail operation logic circuit may remain inactive.

In an embodiment, the common logic signal may be applied to the first slave panel driver during a blank period of the first slave panel driver.

In an embodiment, the first display region and the second display region may emit light at different driving frequencies.

In an embodiment, the display device may further include a third display region in the display panel, and a second slave panel driver configured to drive the third display region based on the common logic signal. The second slave panel driver may receive the common logic signal from the master panel driver without generating the common logic signal.

In an embodiment, the common logic signal may include a first slave common logic signal and a second slave common logic signal. The first slave common logic signal may be applied to the first slave panel driver and the second slave common logic signal may be applied to the second slave panel driver.

In an embodiment, the master panel driver may include a master driving controller. The first slave panel driver may include a first slave driving controller. The second slave panel driver may include a second slave driving controller. The master driving controller may include a first master driving circuit configured to output a signal for performing the first driving operation. The first slave driving controller may include a first-first slave driving circuit configured to output a signal for performing the first driving operation. The second slave driving controller may include a second-first slave driving circuit configured to output a signal for performing the first driving operation. The common logic signal may be a signal such that the first driving operation is performed.

In an embodiment, the first master driving circuit may include a first-first master detail operation logic circuit configured to output a signal for performing a first-first detail operation and a first-second master detail operation logic circuit configured to output a signal for performing a first-second detail operation. The first-first slave driving circuit may include a first-first-first slave detail operation logic circuit configured to output a signal for performing the first-first detail operation and a first-first-second slave detail operation logic circuit configured to output a signal for performing the first-second detail operation. The second-first slave driving circuit may include a second-first-first slave detail operation logic circuit configured to output a signal for performing the first-first detail operation and a second-first-second slave detail operation logic circuit configured to output a signal for performing the first-second detail operation. The common logic signal may be generated by the first-first master detail operation logic circuit. The first slave panel driver may perform the first-first detail operation based on the common logic signal and the second slave panel driver may perform the first-first detail operation based on the common logic signal.

According to embodiments, a display device may include a display panel including a first display region and a second display region, a master panel driver including a common logic circuit configured to generate a common logic signal and a master detail logic circuit configured to generate a master detail logic signal, and configured to drive the first display region based on the common logic signal and the master detail logic signal and a slave panel driver including a first slave detail logic circuit configured to generate a first slave detail logic signal and is configured to drive the second display region based on the common logic signal and the first slave detail logic signal.

In embodiments, the common logic signal may control the master panel driver and the first slave panel driver to perform a common operation.

In embodiments, the common logic signal may be applied to the first slave panel driver during a blank period of the slave panel driver.

In embodiments, the display device may further include a second slave panel driver configured to drive the third display region based on the common logic signal and a second slave detail logic signal, and including a second slave detail logic circuit configured to generate the second slave detail logic signal. The display panel may further include a third display region.

In embodiments, the common logic signal may include a first slave common logic signal and a second slave common logic signal. The first slave common logic signal may control the master panel driver and the first slave panel driver to perform a common operation. The second slave common logic signal may control the master panel driver and the second slave panel driver to perform the common operation.

In embodiments, the first slave common logic signal may be applied to the first slave panel driver in a blank period of the first slave panel driver. The second slave common logic signal may be applied to the second slave panel driver in a blank period of the second slave panel driver.

As described above, in a display device according to embodiments, the display device may include a master panel driver and a slave panel driver. When the master panel driver and the slave panel driver perform a common operation, the master panel driver may generate a common logic signal. The common logic signal may be applied to the slave panel driver. The slave panel driver may not generate a common logic signal for performing the common operation. Accordingly, a power consumption of the display device may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE INVENTIVE CONCEPT

Hereinafter, the present inventive concept will be explained in detail with reference to the accompanying drawings.

Figure 1:
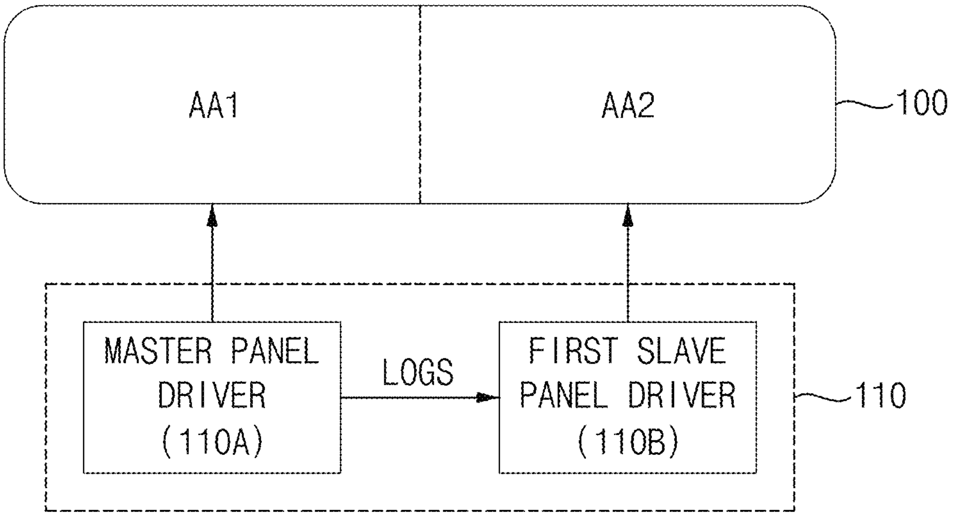
FIG. 1 is a block diagram illustrating a display device according to an embodiment of the present inventive concept.

FIG. 1 is a block diagram illustrating a display device according to an embodiment of the present inventive concept.

Referring to FIG. 1, the display device includes a display panel 100 and a panel driver 110. The display panel 100 may include a first display region AA1 and a second display region AA2. The panel driver 110 may include a master panel driver 110A and a first slave panel driver 110B. The master panel driver 110A may drive the first display region AA1. The first slave panel driver 110B may drive the second display region AA2. However, the present inventive concept is not limited to the display region in which the master panel driver 110A and the first slave panel driver 110B drive. For example, the master panel driver 110A may drive the second display region AA2. For example, the first slave panel driver 110B may drive the first display region AA2. For example, the display panel 100 may be a liquid crystal display (LCD), an organic light emitting diode (OLED) display panel or a quantum dot (QD) display panel, but the present inventive concept is not limited thereto.

In an embodiment, the display panel 100 may include a display region on which an image is displayed and a peripheral region adjacent to the display region. The display region may include the first display region AA1 and the second display region AA2. In an embodiment, the first display region AA1 and the second display region AA2 may emit light as different driving frequency.

In the present embodiment, the master panel driver 110A may output a common logic signal LOGS to the first slave panel driver 110B. The common logic signal LOGS may be a signal for driving the second display region AA2. The common logic signal LOGS may be generated by the master panel driver 110A. The first slave panel driver 110B may not generate the common logic signal LOGS.

Figure 2:
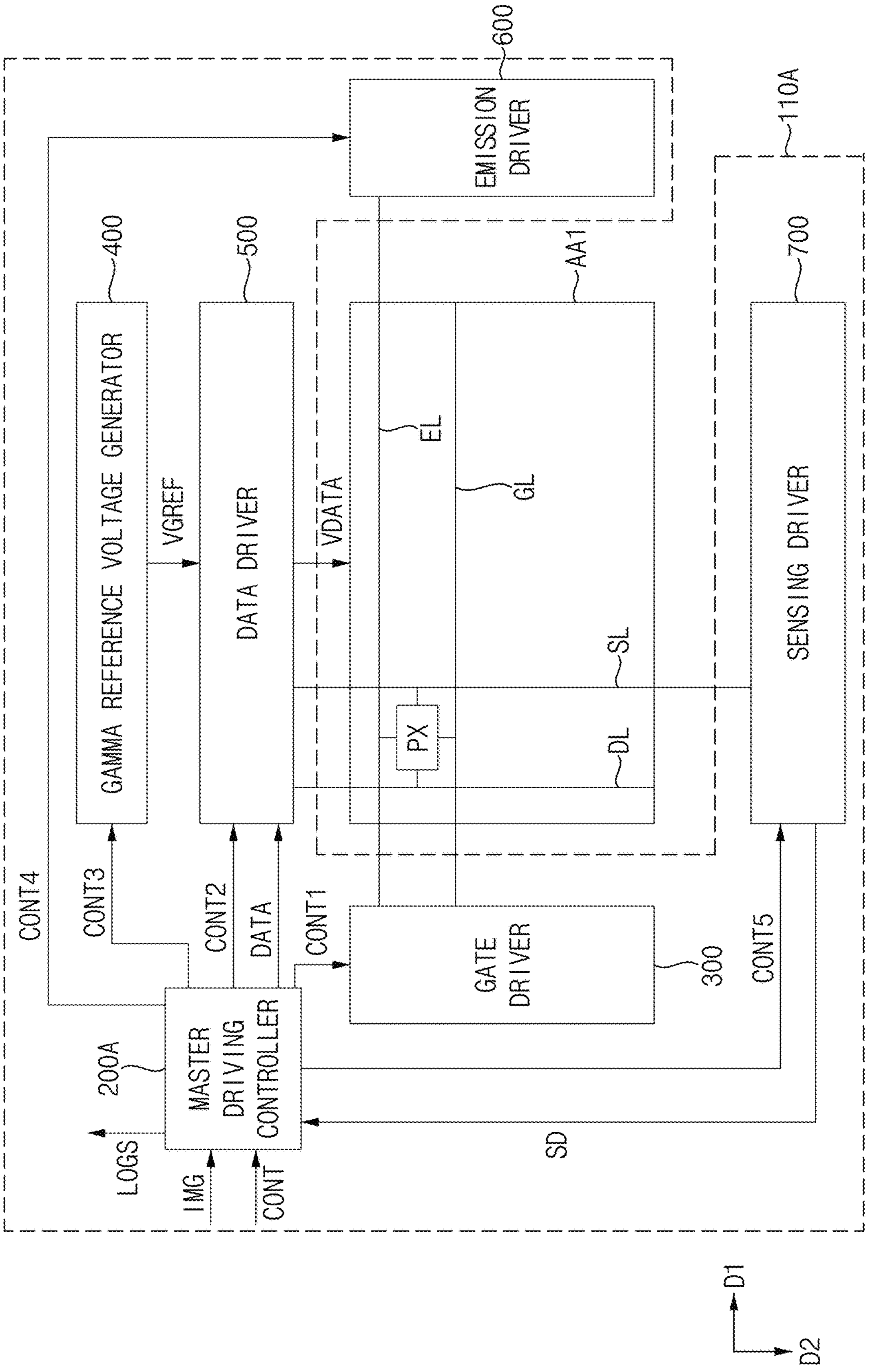
FIG. 2 is a block diagram illustrating a first display region and a master panel driver of a display device of FIG. 1.

FIG. 2 is a block diagram illustrating a first display region AA1 and a master panel driver 110A of a display device of FIG. 1.

Referring to FIG. 1 and FIG. 2, In an embodiment, the master panel driver 110A may include a gate driver 300 configured to provide a gate signal to the pixels PX, a data driver 500 connected to the pixels PX through data lines DL, an emission driver 600 connected to the pixels PX through emission lines EL and a master driving controller 200A configured to control the gate driver 300, the data driver 500 and the emission driver 600. In an embodiment, the master panel driver 700 may further include a sensing driver 700. The sensing driver 700 may be connected to the pixels PX through sensing lines SL.

The display panel 100 may include the data lines DL and the pixels PX connected to the data lines DL. Additionally, the display panel 100 may further include a gate line GL for providing the gate signal to the pixels PX.

The display device may include the first display regions AA1, the master driving controller 200A, the gate driver 300, the gamma reference voltage generator 400, the data driver 500, the emission driver 600 and the sensing driver 700. In an embodiment, the master driving controller 200A and the data driver 500 may be implemented as a single integrated circuit.

In an embodiment, the gate driver 300 may be integrated on the peripheral region of the display panel 100. In an embodiment, the gate driver 300 may be mounted on the peripheral region of the display panel 100.

The display region AA1 may include the gate line GL, the data line DL, the emission line EL and the pixel PX connected to the gate line GL, the data line DL and the emission line EL, electrically. The gate line GL and the data line DL may extend in a direction that intersects each other.

The master driving controller 200A may receive input image data IMG and an input control signal CONT from a host processor (e.g., an application processor and/or a graphic processing unit, etc.). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal. The master driving controller 200A may output the common logic signal LOGS to the first slave driving controller 200B.

The master driving controller 200A may generate a first control signal CONT1, a second control signal CONT2, a third control signal CONT3, a fourth control signal CONT4 and a data signal DATA based on the input image data IMG and the input control signal CONT. In an embodiment, the master driving controller 200A may generate a fifth control signal CONT5 based on the input image data IMG and the input control signal CONT.

The master driving controller 200A may generate the first control signal CONTI for controlling an operation of the gate driver 300 based on the input control signal CONT, and output the first control signal CONTI to the gate driver 300. The first control signal CONTI may include a vertical start signal and a scan clock signal.

The master driving controller 200A may generate the third control signal CONT3 for controlling an operation of the gamma reference voltage generator 400 based on the input control signal CONT, and output the third control signal CONT3 to the gamma reference voltage generator 400.

The master driving controller 200A generates the second control signal CONT2 for controlling an operation of the data driver 500 based on the input control signal CONT, and outputs the second control signal CONT2 to the data driver 500. The second control signal CONT2 may include a horizontal start signal and a load signal.

The master driving controller 200A may generate the data signal DATA based on the input image data IMG and the input control signal CONT. The driving controller 200 may output the data signal DATA to the data driver 500.

The master driving controller 200A may generate the fourth control signal CONT4 for controlling an operation of the emission driver 600 based on the input control signal CONT. The master driving controller 200A may output the fourth control signal CONT4 to the emission driver 600.

The master driving controller 200A may generate the fifth control signal CONT5 for controlling an operation of the sensing driver based on the input control signal CONT, and output the fifth control signal CONT5 to the sensing driver 700.

The gate driver 300 may generate gate signal for driving the gate line GL in response to the first control signal CONTI received from the master driving controller 200A. The gate driver 300 may output the gate signal to the gate line GL of at least one of the display regions AA1, AA2, etc.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF has a value corresponding to each of the data signal DATA. For example, the gamma reference voltage generator 400 may be disposed in the driving controller 200 or in the data driver 500.

The data driver 500 may receive the second control signal CONT2 and the data signal DATA from the master driving controller 200A and receive the gamma reference voltages VGREF from the gamma reference voltage generator 400. The data driver 500 may convert the data signal DATA into data voltages VDATA having an analog type using the gamma reference voltages VGREF. The data driver 500 may output the data voltages VDATA to the data line DL.

In an embodiment, the data driver 500 may be implemented with one or more integrated circuits. In another embodiment, the data driver 500 and the master driving controller 200A may be implemented as a single integrated circuit and the single integrated circuit may be called a timing controller embedded data driver (TED).

The emission driver 600 may generate the emission signal for driving the emission line EL in response to the fourth control signal CONT4 received from the master driving controller 200A. The emission driver 600 may output the emission signal to the emission line EL of at least one of the display regions AA1, AA2, etc.

In an embodiment of the present inventive concept, the emission driver 600 may be integrated on the peripheral region of the display panel 100. In an embodiment of the present inventive concept, the emission driver 600 may be mounted on the peripheral region of the display panel 100.

Although the gate driver 300 is disposed on a first side of the display panel 100, and the emission driver 600 is disposed on a second side of the display panel 100 in FIG. 2 for convenience of explanation, the present inventive concept is not limited thereto. The gate driver 300 and the emission driver 600 may be disposed on the first side of the display panel 100. For example, the gate driver 300 and the emission driver 600 may be disposed on the peripheral region of the display panel 100 on the same side of the display region of the display panel 100. For example, the gate driver 300 and the emission driver 600 may be formed integrally with each other.

In an embodiment, the sensing driver 700 may receive the fifth control signal CONT5 from the master driving controller 200A. The sensing driver 700 may generate sensing data SD by sensing the pixels PX through the sensing lines SL. For example, the sensing driver 700 may sense a driving characteristic (e.g., a mobility and/or a threshold voltage) of the driving transistor by measuring a sensing current (or a sensing voltage) of the driving transistor of the pixels PX through the sensing line SL. For example, an operation sensing the driving characteristic (e.g., a mobility and/or a threshold voltage) of the driving transistor may be called a sensing operation.

In an embodiment, the sensing driver 700 may be implemented with one or more integrated circuits. In another embodiment, the sensing driver 700 may be disposed in the data driver 500 or in the master driving controller 200A.

Additionally, in an embodiment, the master panel driver 110A may not include the sensing driver 700. The present inventive concept is not limited to a type of driver which the master panel driver 110A may include.

Figure 3:
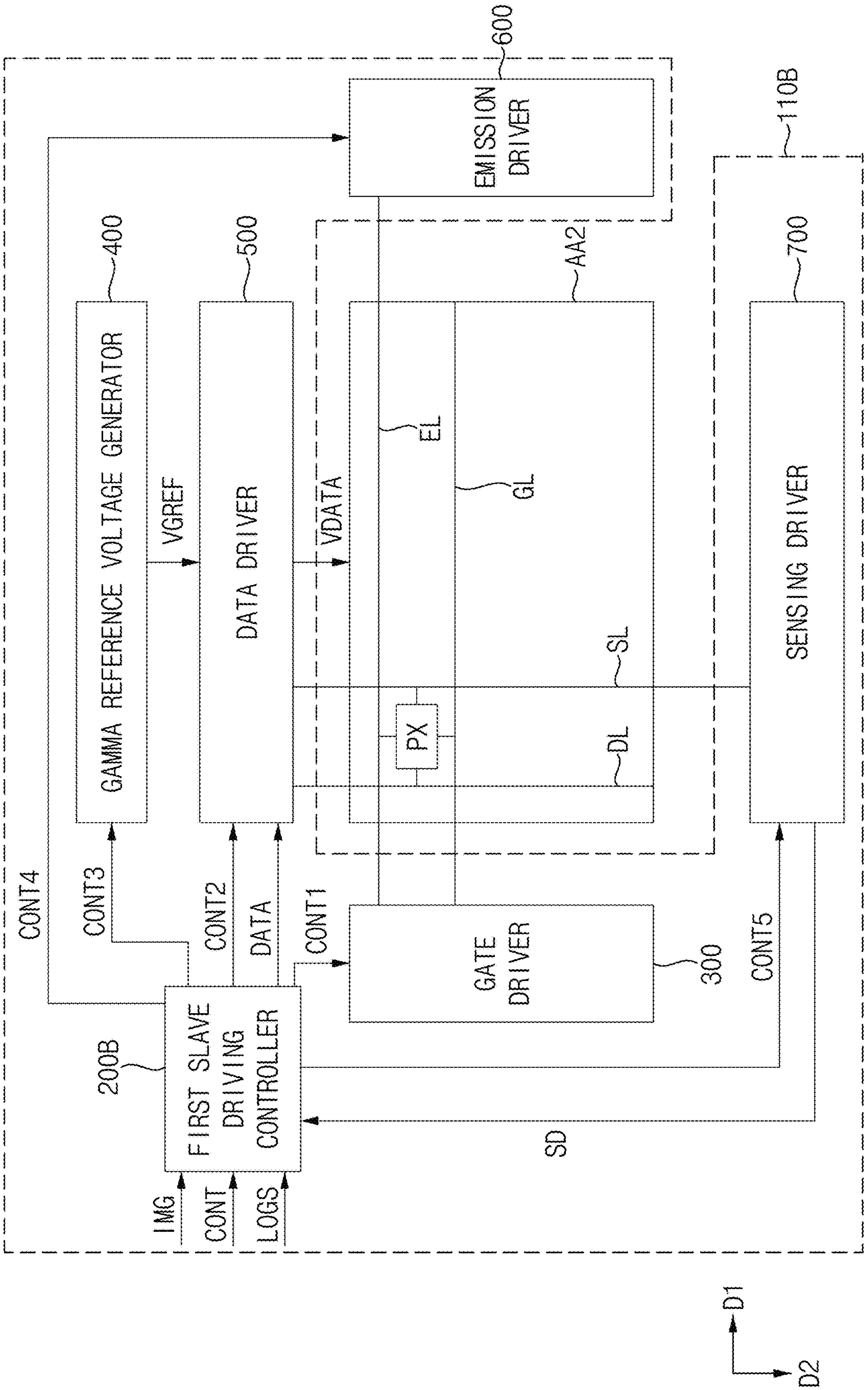
FIG. 3 is a block diagram illustrating a second display region and a first slave panel driver.

FIG. 3 is a block diagram illustrating a second display region AA2 and a first slave panel driver 110B.

Referring to FIG. 3, the first slave panel driver 110B is substantially the same as the master panel driver of FIG. 2 except that the first slave panel driver 110B may include a first slave driving controller 200B. The first slave driving controller 200B does not generate the common logic signal LOGS, and the first slave driving controller 200B receives the common logic signal LOGS from the master driving controller 200A. The same reference numerals will be used to refer to the same and any repetitive explanation concerning the above elements will be omitted.

Additionally, in an embodiment, the first slave panel driver 110B may not include the sensing driver 700. Although the first master panel driver 110A and the first slave panel driver 110B are depicted as having separate embodiments, in some embodiments, some components such as the gate driver 300 and the emission driver 600 may be shared by the first display region AA1 and the second display region AA2. The present inventive concept is not limited to a type of driver which the first slave panel driver 110B may include.

Figure 4:
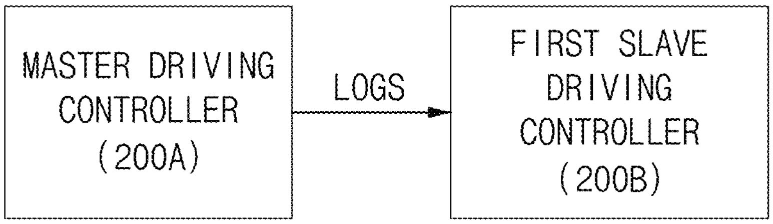
FIG. 4 is a block diagram illustrating a master driving controller included in a master panel driver of FIG. 1 and a first slave driving controller included in a first slave panel driver of FIG. 1.
Figure 5:
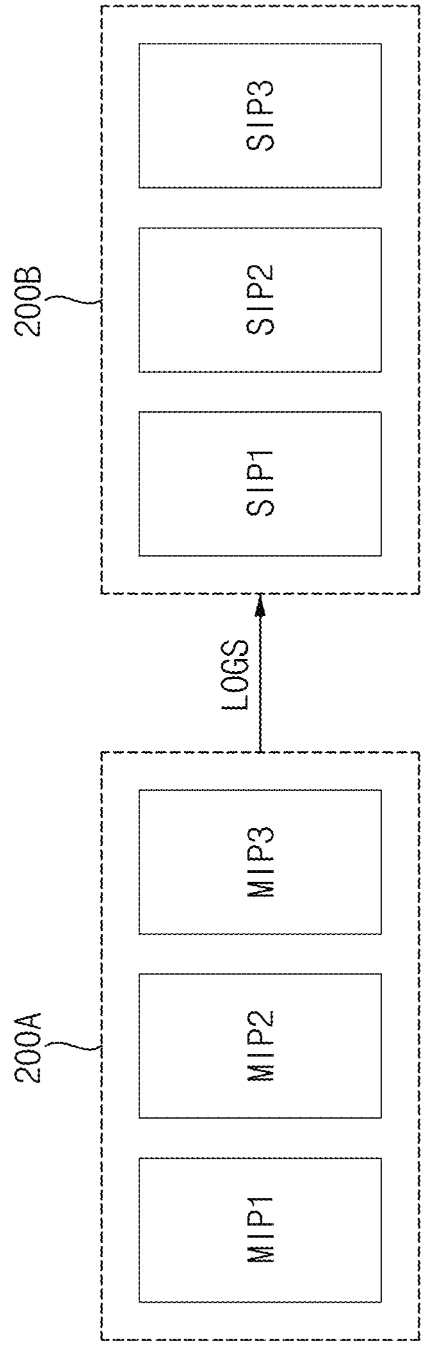
FIG. 5 is a block diagram illustrating a driving circuit included in a master driving controller of FIG. 4 and a driving circuit included in a first slave driving controller of FIG. 4.

FIG. 4 is a block diagram illustrating a master driving controller 200A included in a master panel driver 110A of FIG. 1 and a first slave driving controller 200B included in a first slave panel driver 110B of FIG. 1. FIG. 5 is a block diagram illustrating a driving circuit included in a master driving controller 200A of FIG. 4 and a driving circuit included in a first slave driving controller 200B of FIG. 4.

Referring to FIG. 1 to FIG. 5, the master driving controller 200A may output the common logic signal LOGS to the first slave driving controller 200B.

In the present embodiment, the master driving controller 200A may include a first master driving circuit MIP1, a second master driving circuit MIP2 and a third master driving circuit MIP3. The first slave driving controller 200B may include a first-first slave driving circuit SIP1, a first-second slave driving circuit SIP2 and a first-third slave driving circuit SIP3.

In the present embodiment, the master panel driver 110A and the first slave panel driver 110B may perform a same operation. The same operation may be referred to as a "common operation." For example, the common operation may include a luminance control operation, the sensing operation and an operation of changing the data signal DATA based on sensing data SD (e.g., an external compensation operation). For example, the common operation may include an operation of determining a deterioration region of the display panel, an operation of changing the data signal DATA, an operation of changing the driving frequency of the display panel 100, or etc. However, the present inventive concept is not limited to an operation of panel driver which the common operation include. In an embodiment, the input control signal CONT may include a signal determining the common operation.

In the present embodiment, the first master driving circuit MIP1 may generate a signal performing a first driving operation. For example, the first driving operation may be the luminance control operation. However, the present inventive concept is not limited to a type of the first driving operation. For example, the first driving operation may be the external compensation operation. The first driving operation may be set by a user.

In the present embodiment, when the first driving operation is performed by the master panel driver 110A and the first slave panel driver 110B, the first master driving circuit MIP1 may generate the common logic signal LOGS. The common logic signal LOGS may be a signal for the master panel driver 110A and the first slave panel driver 110B to perform the first driving operation. In the present embodiment, the first-first slave driving circuit SIP1 may not generate the common logic signal LOGS. When the first driving operation is a common operation, the first-first slave driving circuit SIP1 may remain inactive. The first slave panel driver 110B may perform the first driving operation in response to the common logic signal LOGS.

In the present embodiment, the second master driving circuit MIP2 may generate a signal performing a second driving operation. For example, the second driving operation may be a sensing operation. However, the present inventive concept does not limit the second driving operation to any specific type of operation. For example, the second driving operation may be the operation of determining the deterioration region of the display panel 100. For example, the second driving operation may refer to as the luminance control operation. The second driving operation may be set by a user.

In the present embodiment, when the second driving operation is performed by the master panel driver 110A and the first slave panel driver 110B, the second master driving circuit MIP2 may generate the common logic signal LOGS. The common logic signal LOGS may be a signal for the master panel driver 110A and the first slave panel driver 110B to perform the second driving operation. In the present embodiment, the first-second slave driving circuit SIP2 may not generate the common logic signal LOGS. When the second driving operation is a common operation, the first-second slave driving circuit SIP2 may remain inactive. The first slave panel driver 110B may perform the second driving operation in response to the common logic signal LOGS.

In the present embodiment, the third master driving circuit MIP3 may generate a signal performing a third driving operation. For example, the third driving operation may be an external compensation operation. However, the present inventive concept does not limit the third driving operation to any specific type of operation. For example, the third driving operation may be the operation of changing the data signal DATA. For example, the third driving operation may refer to as the sensing operation. The third driving operation may be set by a user.

In the present embodiment, when the third driving operation is performed by the master panel driver 110A and the first slave panel driver 110B, the third master driving circuit MIP3 may generate the common logic signal LOGS. The common logic signal LOGS may be a signal for the master panel driver 110A and the first slave panel driver 110B to perform the third driving operation. In the present embodiment, the first-third slave driving circuit SIP3 may not generate the common logic signal LOGS. When the third driving operation is a common operation, the first-third slave driving circuit SIP3 may remain inactive. The first slave panel driver 110B may perform the third driving operation in response to the common logic signal LOGS.

In an embodiment, the third driving operation is performed by the master panel driver 110A and not the first slave panel driver 110B, and the master panel driver 110A may not output the common logic signal LOGS. For example, when the third driving operation is not the common operation, the third master driving circuit MP3 may not generate the common logic signal LOGS.

In the present embodiment, the master panel driver 110A and the first slave panel driver 110B may perform the common operation in response to the common logic signal LOGS. For example, when the first driving operation is the common operation, the common logic signal LOGS may be a signal that triggers the first driving operation. For example, when the first driving operation and the second driving operation are common operations, the common logic signal LOGS may include a signal for triggering the first driving operation and a signal for triggering the second driving operation. In the present embodiment, the common logic signal LOGS may be generated from the master driving controller 200A. The first slave driving controller 200B may not generate the common logic signal LOGS.

In the present embodiment, the common logic signal LOGS may be applied during a blank period of the first slave panel driver 110B.

In a conventional display device, a conventional master driving controller may generate a signal such that the common operation is performed. A conventional slave driving controller may also generate a signal such that the common operation is performed.

In contrast, in the display device according to the present inventive concept, the master driving controller 200A may generate the common logic signal LOGS but the first slave driving controller 200B may not generate the common logic signal LOGS. Accordingly, power consumption of the display device according to the present inventive concept may be reduced.

In an embodiment, the master driving controller 200A may output a driving data signal different from the common logic signal LOGS to the first slave driving controller 200B. Additionally, the first slave driving controller 200B may output the driving data signal to the master driving controller 200A. However, the present inventive concept is not limited to a type of the driving data signal.

Figure 6:
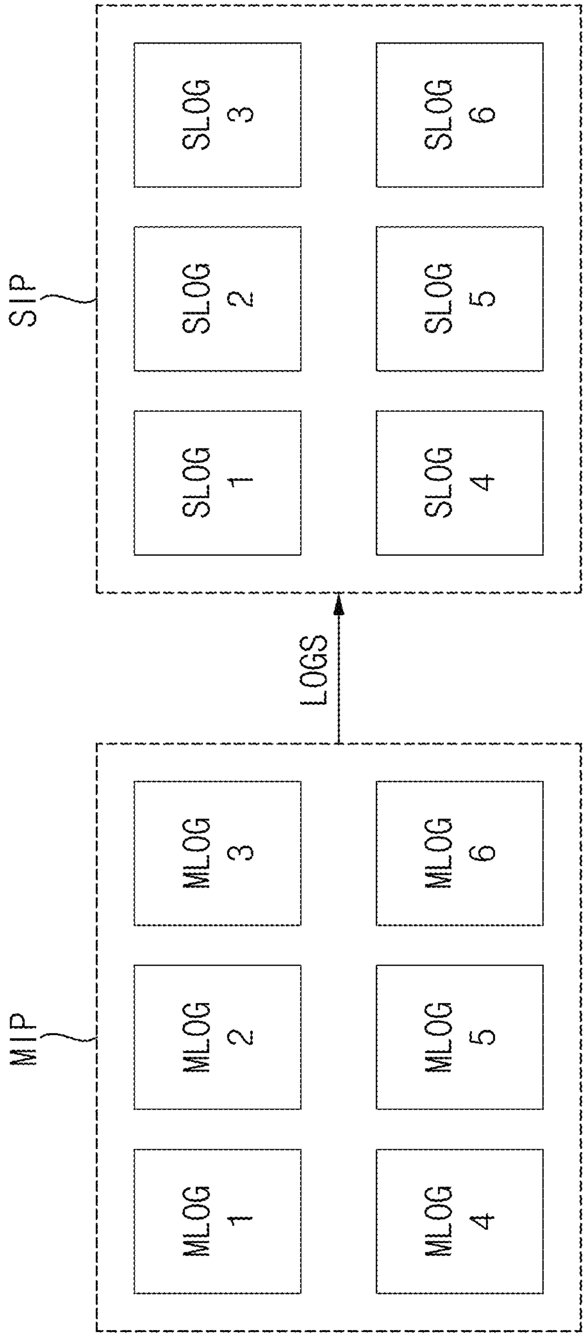
FIG. 6 is a block diagram illustrating a master detail operation logic circuit included in a master driving circuit of FIG. 5, and a slave detail operation logic circuit included in a first slave driving circuit.
Figure 7:
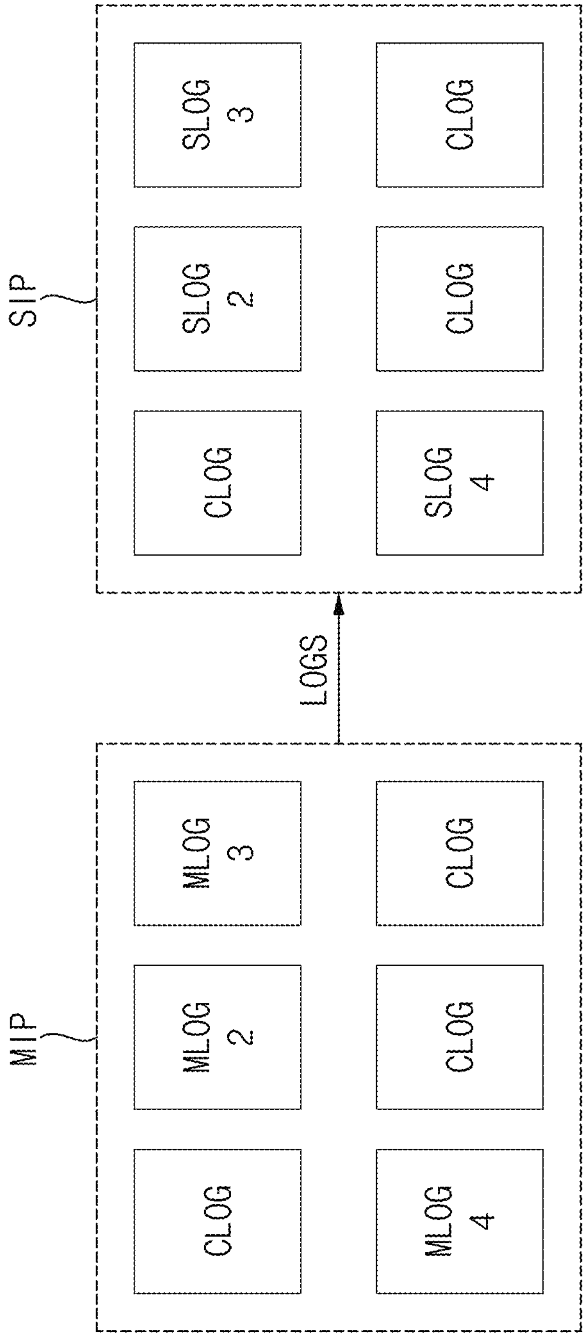
FIG. 7 is a block diagram illustrating an example of a plurality of common logic circuits and a plurality of master detail logic circuits included in a master driving circuit of FIG. 6, and a plurality of common logic circuits and a plurality of slave detail driving circuits included in a first slave driving circuit.
Figure 8:
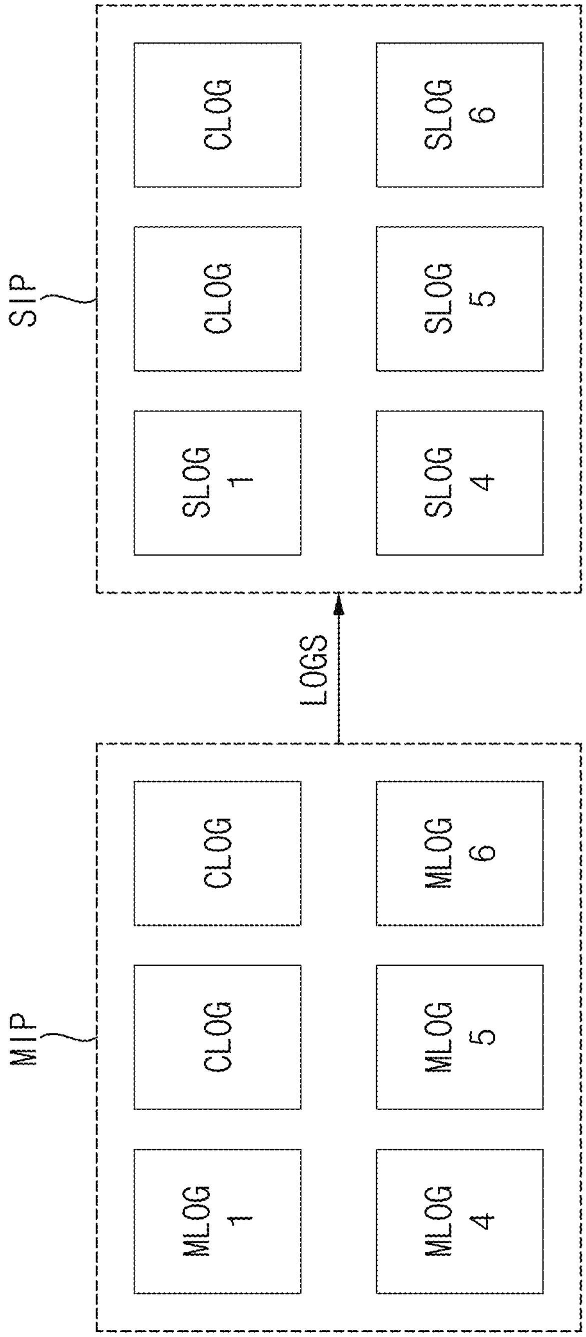
FIG. 8 is a block diagram illustrating an example of a plurality of common logic circuits and a plurality of master detail logic circuits included in a master driving circuit of FIG. 6, and a plurality of common logic circuits and a plurality of slave detail driving circuits included in a first slave driving circuit.

FIG. 6 is a block diagram illustrating a master detail operation logic circuit included in a master driving circuit MIP of FIG. 5, and a slave detail operation logic circuit included in a first slave driving circuit SIP. FIG. 7 is a block diagram illustrating an example of a set of common logic circuits CLOG and a set of master detail logic circuit MLOG included in a master driving circuit MIP of FIG. 6, and a set of common logic circuits CLOG and a set of slave detail driving circuit SLOG included in a first slave driving circuit SIP. FIG. 8 is a block diagram illustrating an example of a set of common logic circuits CLOG and a set of master detail logic circuits MLOG included in a master driving circuit MIP of FIG. 6, and a set of common logic circuits CLOG and a set of slave detail logic circuits SLOG included in a first slave driving circuit SIP. As used herein, a "set" of elements includes one or more elements.

Referring to FIG. 1 to FIG. 8, the master driving circuit MIP may include first to sixth master detail logic circuits MLOG1, MLOG2, MLOG3, MLOG4, MLOG5 and MLOG6. Each of the master detail logic circuits MLOG1, MLOG2, etc. may herein be referred to as the "master detail logic circuit" for simplicity. The common logic circuit CLOG may be a circuit generating a signal for the common operation to be performed. For example, the common logic circuit CLOG may be at least one of the first to sixth master detail logic circuits MLOG1, MLOG2, MLOG3, MLOG4, MLOG5 and MLOG6. For example, a master detail logic circuit may be a circuit generating a signal such that the master panel driver 110A and the first slave panel driver 110B perform different operations from each other. For example, the master detail logic circuit may generate a signal such that the first to sixth master detail logic circuits MLOG1, MLOG2, MLOG3, MLOG4, MLOG5 and MLOG6 and first slave panel driver 110B may perform a different operation. For example, the different operation may be the operation of changing the driving frequency. For example, a first slave detail logic circuit may be a circuit generating a signal (e.g., a first slave detail logic signal) causing the master panel driver 110A and the first slave panel driver 110B to perform a different operation. For example, the different operation may be the operation of changing the driving frequency.

The first master driving circuit MIP1 may include a first-first master detail operation logic circuit, a first-second master detail operation logic circuit, a first-third master detail operation logic circuit, a first-fourth master detail operation logic circuit, a first-fifth master detail operation logic circuit and a first-sixth master detail operation logic circuit.

In the present embodiment, the first driving operation may include first-first to first-sixth detail operations. The first-first master detail operation logic circuit may generate a signal such that the first-first detail operation is performed. The first-second master detail operation logic circuit may generate a signal such that the first-second detail operation is performed. The first-third master detail operation logic circuit may generate a signal such that the first-third detail operation is performed. The first-fourth master detail operation logic circuit may generate a signal such that the first-fourth detail operation is performed. The first-fifth master detail operation logic circuit may generate a signal such that the first-fifth detail operation is performed. The first-sixth master detail operation logic circuit may generate a signal such that the first-sixth detail operation is performed.

The first slave driving circuit SIP may include first to sixth slave detail operation logic circuit SLOG1, SLOG2, SLOG3, SLOG4, SLOG5 and SLOG6. For example, the first-first slave driving circuit SIP1 may include a first-first-first slave detail operation logic circuit, a first-first-second slave detail operation logic circuit, a first-first-third slave detail operation logic circuit, a first-first-fourth slave detail operation logic circuit, a first-first-fifth slave detail operation logic circuit and a first-first-sixth slave detail operation logic circuit.

The first-first-first slave detail operation logic circuit may generate a signal such that the first-first detail operation is performed. The first-first-second slave detail operation logic circuit may generate a signal such that the first-second detail operation is performed. The first-first-third slave detail operation logic circuit may generate a signal such that the first-third detail operation is performed. The first-first-fourth slave detail operation logic circuit may generate a signal such that the first-fourth detail operation is performed. The first-first-fifth slave detail operation logic circuit may generate a signal such that the first-fifth detail operation is performed. The first-first-sixth slave detail operation logic circuit may generate a signal such that the first-sixth detail operation is performed.

For example, when the first driving operation is the luminance control operation, a first-first detail operation may be an operation of controlling a predetermined region of the first display region AA1. Additionally, a first-second detail operation is an operation of increasing or decreasing a luminance of the first display region AA1. A first-third detail operation is an operation of increasing or decreasing a luminance of another predetermined region of the first display region AA1. For example, when the first driving operation is the luminance control operation, a first-first detail operation may be an operation of controlling a predetermined region of the second display region AA2. Additionally, a first-second detail operation is an operation of increasing or decreasing a luminance of the second display region AA2. A first-third detail operation is an operation of increasing or decreasing a luminance of another predetermined region of the second display region AA2. However, the present inventive concept is not limited to operations of the first-first to first-third detail operation included in the first driving operation. For example, the first-first to first-sixth operations may be set by a user.

FIG. 7 depicts an example in which the first-first detail operation, the first-fifth detail operation and the first-sixth detail operation are the common operation. In this case, the first-first master detail operation logic circuit, the first-fifth master detail operation logic circuit and the first-sixth master detail operation logic circuit may be the common logic circuit CLOG. Accordingly, the first-first master detail operation logic circuit, the first-fifth master detail operation logic circuit and the first-sixth master detail operation logic circuit may generate the common logic signal LOGS. Additionally, the first-first-first slave detail operation logic circuit, the first-first-fifth slave detail operation logic circuit and the first-first-sixth slave detail operation logic circuit may be the common logic circuit CLOG. The first-first-first slave detail operation logic circuit, the first-first-fifth slave detail operation logic circuit and the first-first-sixth slave detail operation logic circuit may not generate the common logic signal LOGS. The first slave panel driver 110B may perform the first-first detail operation, the first-fifth detail operation and the first-sixth detail operation in response to the common logic signal LOGS received from the first-first master detail operation logic circuit, the first-fifth master detail operation logic circuit and the first-sixth master detail operation logic circuit.

FIG. 8 depicts an example in which the first-second detail operation and the first-third detail operation are the common operation. In this case, the first-second master detail operation logic circuit and the first-third master detail operation logic circuit, the first-first-second slave detail operation logic circuit and the first-first-third slave detail operation logic circuit may be the common logic circuit CLOG. The first-second master detail operation logic circuit and the first-third master detail operation logic circuit may generate the common logic signal LOGS. The first-first-second slave detail operation logic circuit and the first-first-third slave detail operation logic circuit may not generate the common logic signal LOGS.

The first slave panel driver 110B may perform the first-second detail operation and the first-third detail operation in response to the common logic signal LOGS received from the first-second master detail operation logic circuit and the first-third master detail operation logic circuit.

For example, although not explicitly shown, the second master driving circuit MIP2 may include a second-first master detail operation logic circuit, a second-second master detail operation logic circuit, a second-third master detail operation logic circuit, a second-fourth master detail operation logic circuit, a second-fifth master detail operation logic circuit and a second-sixth master detail operation logic circuit.

In the present embodiment, the second driving operation may include second-first to second-sixth detail operations. The second-first master detail operation logic circuit may generate a signal that causes the second-first detail operation to be performed. The second-second master detail operation logic circuit may generate a signal that causes the second-second detail operation to be performed. The second-third master detail operation logic circuit may generate a signal that causes the second-third detail operation to be performed. The second-fourth master detail operation logic circuit may generate a signal that causes the second-fourth detail operation to be performed. The second-fifth master detail operation logic circuit may generate a signal that causes the second-fifth detail operation is performed. The second-sixth master detail operation logic circuit may generate a signal that causes the second-sixth detail operation is performed.

The first-second slave driving circuit SIP2 may include first to sixth slave detail operation logic circuit. For example, the first-second slave driving circuit SIP2 may include a first-second-first slave detail operation logic circuit, a first-second-second slave detail operation logic circuit, a first-second-third slave detail operation logic circuit, a first-second-fourth slave detail operation logic circuit, a first-second-fifth slave detail operation logic circuit and a first-second-sixth slave detail operation logic circuit.

The first-second-first slave detail operation logic circuit may generate a signal that causes the second-first detail operation to be performed. The first-second-second slave detail operation logic circuit may generate a signal that causes the second-second detail operation to be performed. The first-second-third slave detail operation logic circuit may generate a signal that causes the second-third detail operation to be performed. The first-second-fourth slave detail operation logic circuit may generate a signal that causes the second-fourth detail operation to be performed. The first-second-fifth slave detail operation logic circuit may generate a signal that causes the second-fifth detail operation is performed. The first-second-sixth slave detail operation logic circuit may generate a signal that causes the second-sixth detail operation to be performed.

For example, when the second driving operation is the sensing operation, a second-first detail operation may be an operation of sensing a predetermined region of the display panel 100. Additionally, a second-second detail operation is an operation of real-time sensing the display panel 100. A second-third detail operation is an operation of changing the data voltage VDATA. However, the present inventive concept is not limited to operations of the second-first to second-third detail operation included in the second driving operation. For example, the second-first to second-sixth operations may be set by a user.

In the example of FIG. 7, the second-first detail operation, the second-fifth detail operation and the second-sixth detail operation are the common operation. In this case, the second-first master detail operation logic circuit, the second-fifth master detail operation logic circuit and the second-sixth master detail operation logic circuit may be the common logic circuit CLOG. Accordingly, the second-first master detail operation logic circuit, the second-fifth master detail operation logic circuit and the second-sixth master detail operation logic circuit may generate the common logic signal LOGS. Additionally, the first-second-first slave detail operation logic circuit, the first-second-fifth slave detail operation logic circuit and the first-second-sixth slave detail operation logic circuit may be the common logic circuit CLOG. The first-second-first slave detail operation logic circuit, the first-second-fifth slave detail operation logic circuit and the first-second-sixth slave detail operation logic circuit may not generate the common logic signal LOGS. The first slave panel driver 110B may perform the second-first detail operation, the second-fifth detail operation and the second-sixth detail operation in response to the common logic signal LOGS received from the second-first master detail operation logic circuit, the second-fifth master detail operation logic circuit and the second-sixth master detail operation logic circuit.

In the example of FIG. 8, the second-second detail operation and the second-third detail operation are the common operation. In this case, the second-second master detail operation logic circuit and the second-third master detail operation logic circuit, the first-second-second slave detail operation logic circuit and the first-second-third slave detail operation logic circuit may be the common logic circuit CLOG. The second-second master detail operation logic circuit and the second-third master detail operation logic circuit may generate the common logic signal LOGS. The first-second-second slave detail operation logic circuit and the first-second-third slave detail operation logic circuit may not generate the common logic signal LOGS.

The first slave panel driver 110B may perform the second-second detail operation and the second-third detail operation in response to the common logic signal LOGS received from the second-second master detail operation logic circuit and the second-third master detail operation logic circuit.

For example, the third master driving circuit MIP3 may include a third-first master detail operation logic circuit, a third-second master detail operation logic circuit, a third-third master detail operation logic circuit, a third-fourth master detail operation logic circuit, a third-fifth master detail operation logic circuit and a third-sixth master detail operation logic circuit.

In the present embodiment, the third driving operation may include third-first to third-sixth detail operations. The third-first master detail operation logic circuit may generate a signal that causes the third-first detail operation to be performed. The third-second master detail operation logic circuit may generate a signal that causes the third-second detail operation to be performed. The third-third master detail operation logic circuit may generate a signal that causes the third-third detail operation to be performed. The third-fourth master detail operation logic circuit may generate a signal that causes the third-fourth detail operation to be performed. The third-fifth master detail operation logic circuit may generate a signal that causes the third-fifth detail operation to be performed. The third-sixth master detail operation logic circuit may generate a signal that causes the third-sixth detail operation to be performed.

The first-third slave driving circuit SIP3 may include first to sixth slave detail operation logic circuit. For example, the first-third slave driving circuit SIP3 may include a first-third-first slave detail operation logic circuit, a first-third-second slave detail operation logic circuit, a first-third-third slave detail operation logic circuit, a first-third-fourth slave detail operation logic circuit, a first-third-fifth slave detail operation logic circuit and a first-third-sixth slave detail operation logic circuit.

The first-third-first slave detail operation logic circuit may generate a signal that causes the third-first detail operation to be performed. The first-third-second slave detail operation logic circuit may generate a signal that causes the third-second detail operation to be performed. The first-third-third slave detail operation logic circuit may generate a signal that causes the third-third detail operation to be performed. The first-third-fourth slave detail operation logic circuit may generate a signal that causes the third-fourth detail operation to be performed. The first-third-fifth slave detail operation logic circuit may generate a signal that causes the third-fifth detail operation to be performed. The first-third-sixth slave detail operation logic circuit may generate a signal that causes the third-sixth detail operation to be performed.

For example, when the third driving operation is the external compensation operation, a third-first detail operation may be an external compensation operation on a predetermined region of the display panel 100. Additionally, a third-second detail operation is an operation of storing the sensing data SD. A third-third detail operation is an operation of generating the data signal DATA based on the sensing data SD. However, the present inventive concept is not limited to operations of the third-first to third-third detail operation included in the third driving operation. For example, the third-first to third-sixth operations may be set by a user.

For example, the third-first detail operation, the third-fifth detail operation and the third-sixth operation are the common operation, the third-first master detail operation logic circuit, the third-fifth master detail operation logic circuit and the third-sixth master detail operation logic circuit may be the common logic circuit CLOG. Accordingly, the third-first master detail operation logic circuit, the third-fifth master detail operation logic circuit and the third-sixth master detail operation logic circuit may generate the common logic signal LOGS. Additionally, the first-third-first slave detail operation logic circuit, the first-third-fifth slave detail operation logic circuit and the first-third-sixth slave detail operation logic circuit may be the common logic circuit CLOG. The first-third-first slave detail operation logic circuit, the first-third-fifth slave detail operation logic circuit and the first-third-sixth slave detail operation logic circuit may not generate the common logic signal LOGS. The first slave panel driver 110B may perform the third-first detail operation, the third-fifth detail operation and the third-sixth detail operation in response to the common logic signal LOGS received from the third-first master detail operation logic circuit, the third-fifth master detail operation logic circuit and the third-sixth master detail operation logic circuit.

For example, if the third-second detail operation and the third-third detail operation are the common operation, the third-second master detail operation logic circuit and the third-third master detail operation logic circuit, the first-third-second slave detail operation logic circuit and the first-third-third slave detail operation logic circuit may be the common logic circuit CLOG. The third-second master detail operation logic circuit and the third-third master detail operation logic circuit may generate the common logic signal LOGS. The first-third-second slave detail operation logic circuit and the first-third-third slave detail operation logic circuit may not generate the common logic signal LOGS.

The first slave panel driver 110B may perform the third-second detail operation and the third-third detail operation in response to the common logic signal LOGS received from the third-second master detail operation logic circuit and the third-third master detail operation logic circuit.

In the present embodiment, the common logic circuit CLOG included in the first slave driving circuit SIP may not generate the common logic signal LOGS. The first slave panel driver 110B may perform the common operation in response to the common logic signal LOGS received from the master panel driver 110A. Accordingly, power consumption of the display device may be reduced. Additionally, the first slave driving circuit SIP may not generate the common logic signal LOGS, so that the first slave driving circuit SIP may not include a circuit for generating the common signal LOGS. Accordingly, the size of the first slave driving controller 200B may be reduced. Additionally, integration of the display device may be improved.

In an embodiment, the common logic circuit CLOG may be changed. In an embodiment, the common logic circuit CLOG may be changed in real-time in response to the input control signal CONT.

Figure 9:
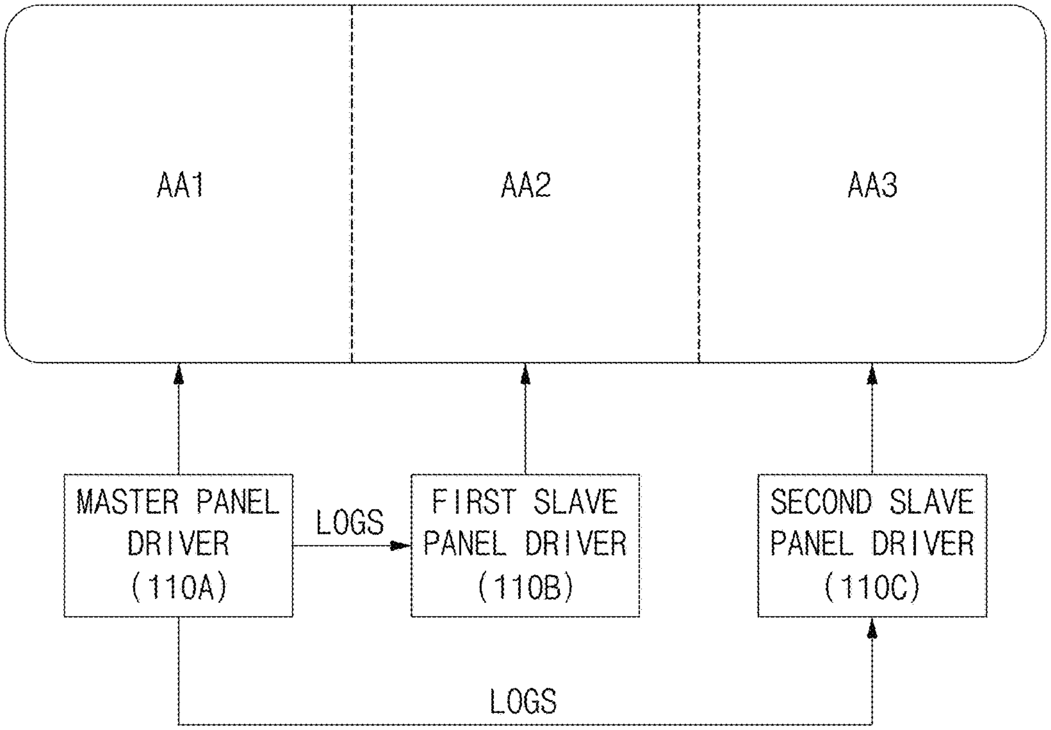
FIG. 9 is a block diagram illustrating an example of a third display region and a second slave panel driver included in the display device of FIG. 1.

FIG. 9 is a block diagram illustrating an example of a third display region AA3 and a second slave panel driver 110C included in the display device of FIG. 1.

Referring to FIG. 9, a second slave panel driver 110C is substantially the same as the first slave panel driver 110B of FIG. 3. Hence, the same reference numerals will be used to refer to the same and any repetitive explanation concerning the above elements will be omitted.

In the present embodiment, the second panel driver 110C may receive the common logic signal LOGS. The common logic signal LOGS may be a signal such that the master panel driver 110A, the first slave panel driver 110B and the second slave panel driver 110C may perform the common operation.

In the present embodiment, the second slave panel driver 110C may include the common logic circuit and a second slave detail logic circuit. For example, the second slave detail logic circuit may be a circuit generating a signal (e.g., a second slave detail logic signal) such that the master panel driver 110A and the second slave panel driver 110C perform different operations from each other. For example, the different operation may be the operation of changing the driving frequency.

In the present embodiment, the first slave panel driver 110B and the second slave panel driver 110C may not generate the common logic signal LOGS. Accordingly, the power consumption of the display device may be further reduced.

Figure 10:
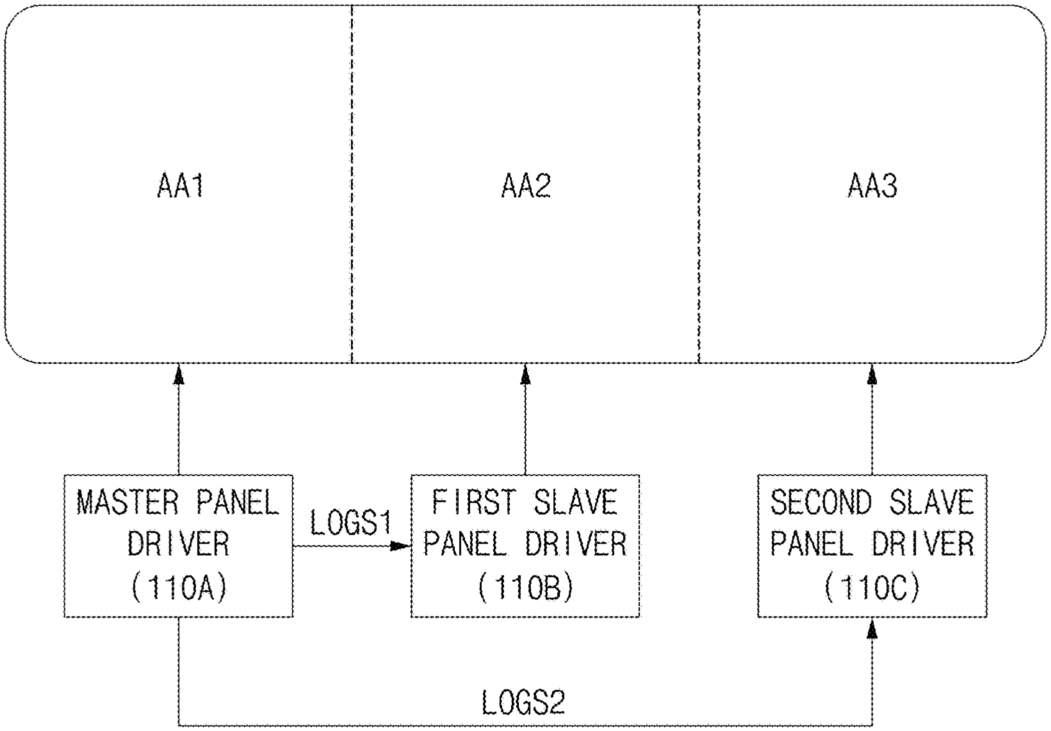
FIG. 10 is a block diagram illustrating an example of a third display region and a second slave panel driver included in the display device of FIG. 1.

FIG. 10 is a block diagram illustrating an example of a third display region AA3 and a second slave panel driver 110C included in the display device of FIG. 1.

Referring to FIG. 9 and FIG. 10, a display device of FIG. 10 is substantially the same as a display device of FIG. 9 except that the first slave panel driver 110B may receive a first common logic signal LOGS1 and the second slave panel driver 110C may receive a second common logic signal LOGS2, so that the same reference numerals will be used to refer to the same elements and any repetitive explanation concerning the above elements will be omitted.

In the present embodiment, the first slave panel driver 110B may receive the first common logic signal LOGS1. The first common logic signal LOGS1 may be a signal such that the master panel driver 110A and the first slave panel driver 110B may perform the common operation. The common operation of the master panel driver 110A and the first slave panel driver 110B may be called a first common operation.

In the present embodiment, the second slave panel driver 110C may receive the second common logic signal LOGS2. The second common logic signal LOGS2 may be a signal such that the master panel driver 110A and the second slave panel driver 110C may perform the common operation. The common operation of the master panel driver 110A and the second slave panel driver 110C may be called a second common operation.

In the present embodiment, the first slave panel driver 110B may not generate the first common logic signal LOGS1. The second slave panel driver 110C may not generate the second common logic signal LOGS2. Accordingly, the power consumption of the display device may be further reduced.

Additionally, the first common operation and the second common operation may be different, so that the number of the first common logic signal LOGS1 and the number of the second common logic signal LOGS2 may be different. Accordingly, the power consumption of the display device may be controlled more efficiently.

Figure 11:
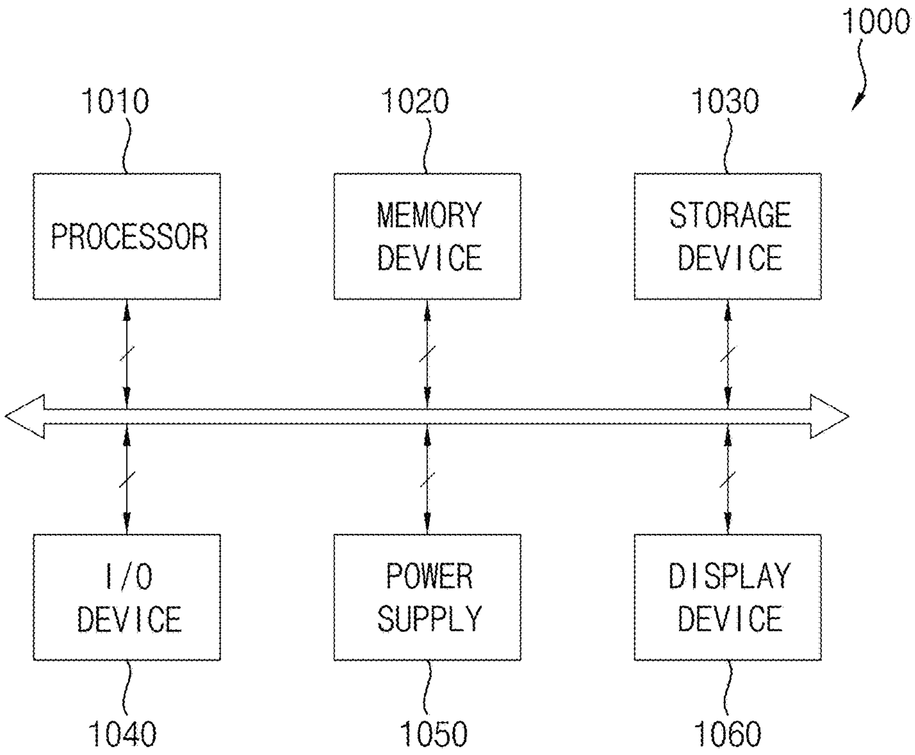
FIG. 11 is a block diagram illustrating an electronic apparatus according to an embodiment of the present inventive concept.
Figure 12:
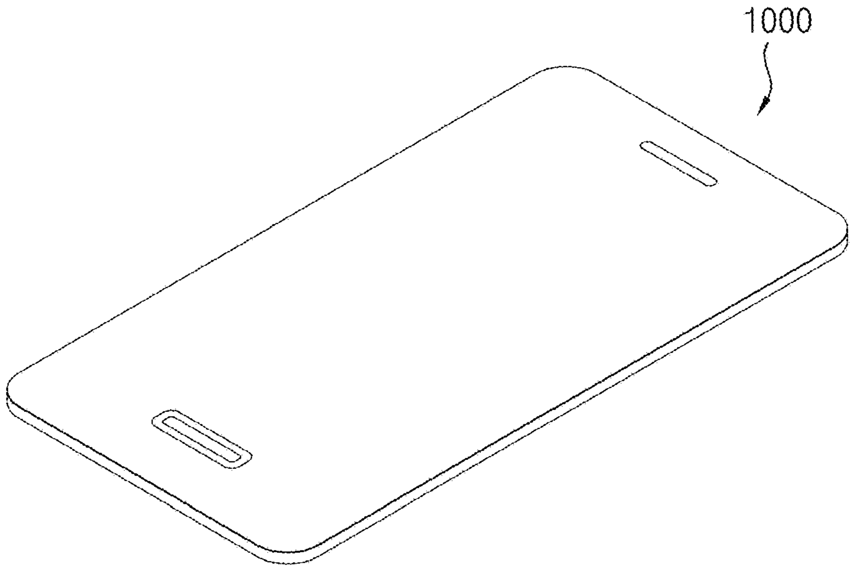
FIG. 12 is a diagram illustrating an example in which the electronic apparatus of FIG. 11 is implemented as a smart phone.

FIG. 11 is a block diagram illustrating an electronic apparatus according to an embodiment of the present inventive concept. FIG. 12 is a diagram illustrating an example in which the electronic apparatus of FIG. 11 is implemented as a smart phone.

Referring to FIGS. 11 and 12, the electronic apparatus 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 12, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the master panel driver 110A of FIG. 2 and the first slave panel driver 110B of FIG. 3

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic apparatus 1000. The display device 1060 may be coupled to other components via the buses or other communication links.

The display device according to the embodiments may be applied to a display device included in a computer, a notebook, a mobile phone, a smart phone, a smart pad, a PMP, a PDA, an MP3 player, or the like.

The foregoing is illustrative of the present inventive concept and is not to be construed as limiting. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. The present inventive concept is defined by the following claims and equivalents of the claims.

What is claimed is:

1. A display device comprising:

a display panel including a first display region and a second display region; and a master panel driver and a first slave panel driver configured to drive the first display region and the second display region, respectively, based on a common logic signal that is generated by the master panel driver, wherein the first slave panel driver is configured to receive the common logic signal from the master panel driver without generating the common logic signal, wherein the master panel driver includes a master driving controller, wherein the first slave panel driver includes a first slave driving controller, wherein the master driving controller includes a first master driving circuit configured to output a signal for performing a first driving operation, wherein the first slave driving controller includes a first-first slave driving circuit configured to output a signal for performing the first driving operation, and wherein the common logic signal is a signal for performing the first driving operation, wherein the first master driving circuit includes:

a first-first master detail operation logic circuit configured to output a signal for performing a first-first detail operation; and a first-second master detail operation logic circuit configured to output a signal performing a first-second detail operation, wherein the first-first slave driving circuit includes:

a first-first-first slave detail operation logic circuit configured to output a signal for performing the first-first detail operation; and a first-first-second slave detail operation logic circuit configured to output a signal for performing the first-second detail operation, wherein the common logic signal is generated by the first-first master detail operation logic circuit, and wherein the first slave panel driver is configured to perform the first-first detail operation based on the common logic signal.

2. The display device of claim 1, wherein the master driving controller is configured to generate the common logic signal and to output the common logic signal to the first slave driving controller.

3. The display device of claim 1, wherein the common logic signal is applied to the first slave driving controller, and the first-first-first slave detail operation logic circuit remains inactive.

4. The display device of claim 1, wherein the common logic signal is applied to the first slave panel driver during a blank period of the first slave panel driver.

5. The display device of claim 1, wherein the first display region and the second display region emit light at different driving frequencies.

6. The display device of claim 1, further comprising:

a third display region in the display panel:

a second slave panel driver configured to drive the third display region based on the common logic signal that is received from the master panel driver, and wherein no common logic signal is generated by the second slave panel driver.

7. The display device of claim 6, wherein the common logic signal includes a first slave common logic signal and a second slave common logic signal, and wherein the first slave common logic signal is applied to the first slave panel driver, and the second slave common logic signal is applied to the second slave panel driver.

8. The display device of claim 1, wherein the master panel driver includes a common logic circuit configured to generate the common logic signal and a master detail logic circuit configured to generate a master detail logic signal, and configured to drive the first display region based on the common logic signal and the master detail logic signal; and the first slave panel driver including a first slave detail logic circuit configured to generate a first slave detail logic signal and configured to drive the second display region based on the common logic signal and the first slave detail logic signal.

9. The display device of claim 8, wherein the common logic signal controls the master panel driver and the first slave panel driver to perform a common operation.

10. The display device of claim 8, wherein the common logic signal is applied to the first slave panel driver during a blank period of the first slave panel driver.

11. The display device of claim 8, further comprising:

a second slave panel driver configured to drive a third display region based on the common logic signal and a second slave detail logic signal, and including a second slave detail logic circuit configured to generate the second slave detail logic signal, wherein the display panel further includes the third display region.

12. The display device of claim 11, wherein the common logic signal includes a first slave common logic signal and a second slave common logic signal, wherein the first slave common logic signal controls the master panel driver and the first slave panel driver to perform a common operation, and wherein the second slave common logic signal controls the master panel driver and the second slave panel driver to perform the common operation.

13. The display device of claim 12, wherein the first slave common logic signal is applied to the first slave panel driver in a blank period of the first slave panel driver, and wherein the second slave common logic signal is applied to the second slave panel driver in a blank period of the second slave panel driver.

14. A display device comprising:

a display panel including a first display region and a second display region; and a master panel driver and a first slave panel driver configured to drive the first display region and the second display region, respectively, based on a common logic signal that is generated by the master panel driver, wherein the first slave panel driver is configured to receive the common logic signal from the master panel driver without generating the common logic signal, wherein the master panel driver includes a master driving controller, wherein the first slave panel driver includes a first slave driving controller, wherein the master driving controller includes a first master driving circuit configured to output a signal for performing a first driving operation, wherein the first slave driving controller includes a first-first slave driving circuit configured to output a signal for performing the first driving operation, and wherein the common logic signal is a signal for performing the first driving operation, wherein the master driving controller further includes a second master driving circuit such that the master panel driver performs a second driving operation different from the first driving operation, wherein the first slave driving controller further includes a first-second slave driving circuit such that the first slave panel driver performs the second driving operation, wherein the common logic signal includes a first common logic signal and a second common logic signal, and wherein the first common logic signal is a signal for performing the first driving operation and the second common logic signal is a signal for performing the second driving operation.

15. The display device of claim 14, wherein the second master driving circuit includes:

a second-first master detail operation logic circuit configured to output a signal for performing a second-first detail operation; and a second-second master detail operation logic circuit configured to output a signal for performing a second-second detail operation, wherein the first-second slave driving circuit includes:

a first-second-first slave detail operation logic circuit configured to output a signal for performing the second-first detail operation; and a first-second-second slave detail operation logic circuit configured to output a signal for performing the second-second detail operation, wherein the second common logic signal is generated by the second-first master detail operation logic circuit, and wherein the first slave panel driver is configured to perform the second-first detail operation based on the second common logic signal.

16. The display device of claim 15, wherein the second common logic signal is applied to the first slave driving controller, and the first-second-first slave detail operation logic circuit remains inactive.

17. A display device comprising:

a display panel including a first display region, a second display region, and a third display region;

a master panel driver and a first slave panel driver configured to drive the first display region and the second display region, respectively, based on a common logic signal that is generated by the master panel driver; and a second slave panel driver configured to drive the third display region based on the common logic signal that is received from the master panel driver, wherein the first slave panel driver is configured to receive the common logic signal from the master panel driver without generating the common logic signal, and wherein no common logic signal is generated by the second slave panel driver, wherein the master panel driver includes a master driving controller, wherein the first slave panel driver includes a first slave driving controller, wherein the second slave panel driver includes a second slave driving controller, wherein the master driving controller includes a first master driving circuit such that the master panel driver performs a first driving operation, wherein the first slave driving controller includes a first-first slave driving circuit configured to output a signal for performing the first driving operation, wherein the second slave driving controller includes a second-first slave driving circuit configured to output a signal for performing the first driving operation, and wherein the common logic signal is a signal for performing the first driving operation.

18. The display device of claim 17, wherein the first master driving circuit includes:

a first-first master detail operation logic circuit configured to output a signal for performing a first-first detail operation; and a first-second master detail operation logic circuit configured to output a signal for performing a first-second detail operation, wherein the first-first slave driving circuit comprises:

a first-first-first slave detail operation logic circuit configured to output a signal for performing the first-first detail operation; and a first-first-second slave detail operation logic circuit configured to output a signal for performing the first-second detail operation, wherein the second-first slave driving circuit includes:

a second-first-first slave detail operation logic circuit configured to output a signal for performing the first-first detail operation; and a second-first-second slave detail operation logic circuit configured to output a signal for performing the first-second detail operation, wherein the common logic signal is generated by the first-first master detail operation logic circuit, and wherein the first slave panel driver is configured to perform the first-first detail operation based on the common logic signal and the second slave panel driver is configured to perform the first-first detail operation based on the common logic signal.

* * * * *